United States Patent [19]

Giedd et al.

[11] 4,216,478

[45] Aug. 5, 1980

[54] THERMAL STRIP CHART RECORDER

[75] Inventors: Gary R. Giedd, Pleasant Valley; Arthur F. Karsch; Sydney L. Lindauer, both of Yorktown Heights, all of N.Y.

[73] Assignee: International Business Machines Corporation, Armonk, N.Y.

[21] Appl. No.: 957,784

[22] Filed: Nov. 6, 1978

[51] Int. Cl.$^2$ ............................................. G01D 15/10
[52] U.S. Cl. .................................. 346/61; 346/76 R; 346/76 PH
[58] Field of Search ................. 346/76 PH, 76 R, 61, 346/139 C

[56] References Cited

U.S. PATENT DOCUMENTS

| | | | |
|---|---|---|---|
| 3,359,565 | 12/1967 | Griffith | 346/139 C |
| 3,754,279 | 8/1973 | Valenti | 346/76 PH |
| 3,787,886 | 1/1974 | McCrady | 346/76 PH |
| 3,879,738 | 4/1975 | Riedl | 346/76 PH |
| 3,949,402 | 4/1976 | Kelley | 346/76 PH X |
| 3,971,041 | 7/1976 | Mason | 346/76 PH |
| 4,017,868 | 4/1977 | Keating | 346/76 PH X |
| 4,119,974 | 10/1978 | Ondis | 346/76 PH X |

*Primary Examiner*—Joseph W. Hartary
*Attorney, Agent, or Firm*—Ronald L. Drumheller

[57] ABSTRACT

A thermal strip chart recorder which allows plotting of one or more analog graphs and simultaneous printing of a plurality of lines of related alphanumeric information. Thermally sensitive chart paper is transported around an edge structure and across a viewing platen. The edge structure has an elongate flat surface having two longitudinal edges which are parallel to each other and transverse to the strip of paper. One of these edges acts as a knife edge for plotting one or more analog graphs using a corresponding number of heated galvanometric stylii. The flat surface is used to simultaneously print a plurality of lines of alphanumeric data using an opposing thermographic print head having an elongate array of selectively heatable elements oriented transverse to the paper strip. The flat surface is resilient over at least the portion thereof opposing the print head thermal elements.

22 Claims, 2 Drawing Figures

THERMAL STRIP CHART RECORDER

DESCRIPTION

1. Technical Field

This invention relates to strip chart recorders and more particularly to a thermographic strip chart recorder which not only plots graphs but also prints alphanumeric characters.

It is an object of the invention to provide an improved thermographic strip chart recorder which can print multiple lines of alphanumeric characters and plot a graph simultaneously.

Another object is to thermally print alphanumeric data in real time registration with graph plotting.

A further object of this invention is to thermally print multiple lines of alphanumeric data without encumbering or obscuring the surface of the viewing platen of the recorder and without obscuring the printing or plotting operations.

Another object is to thermally print multiple lines of alphanumeric characters on the edge of the platen of the recorder.

Still another object of this invention is to provide a platen edge structure which can be used to thermally print multiple lines of characters as well as to plot graphs with one or more heated galvanometric stylii.

2. Background Art

U.S. Pat. No. 3,754,279 issued on Aug. 21, 1973 to Valenti et al describes a recorder designed to both plot and print thermographically. However, the print head is located on the viewing platen which obscures observation of the recorded trace. Since the print head is furthermore displaced in position from the plotting stylus, it introduces additional limitations. In order to print characters which are positionally correlated with the tracing, the characters must be generated later in time than the corresponding trace position and/or the characters must be stored or delayed for a fixed period. When the recorder has multiple paper speeds, the position correlation problem becomes even more complicated because the period of delay is not always the same but must be correlated to the paper speed.

U.S. Pat. No. 4,017,868 issued to Keating on Apr. 12, 1977 describes a recorder which solves these problems because printing and plotting are done in transverse alignment with each other on the same knife edge member. The print head does not obscure viewing of the platen and there is no time registration difficulty, but when the print head is enlarged in the transverse dimension so that it may be used to form several characters simultaneously, it quickly becomes difficult to achieve and maintain alignment of the print head with the knife edge. As the row of thermal elements becomes longer, some of the elements tend to lose contact with the knife edge. The problem cannot be solved by increasing the radius of curvature of the knife edge or by making the edge resilient because plotting quality with the stylus will then deteriorate as the resulting plot line becomes less sharp.

On the other hand, if the print head is on the platen surface, it creates a structural and aesthetic obstruction even when it is closely adjacent to the knife edge. If the print head is placed under the platen or before the knife edge, observation of the print head is obscured and operator inconveniences and structural complexity results.

DISCLOSURE OF INVENTION

For further comprehension of the invention, and of the objects and advantages thereof, reference will be had to the following description and accompanying drawings, and to the appended claims in which the various novel features of the invention are more particularly set forth.

The present invention overcomes the problems with the prior solutions. According to this invention the edge structure is contoured so as to have two closely spaced parallel edges with a flat surface connecting the edges. One of the edges acts as the knife edge for plotting while the closely adjacent flat surface is used for printing. The flat surface is furthermore resilient, at least in the region opposing the print elements. While printing and plotting are not precisely laterally aligned with each other, they may be out of alignment by as little as a millimeter. At the same time, the print head is neither obscuring the top of the platen nor is it being obscured by the platen. Furthermore, print head widths of 50 millimeters or more can be easily aligned with the resilient flat surface.

Figure 1:
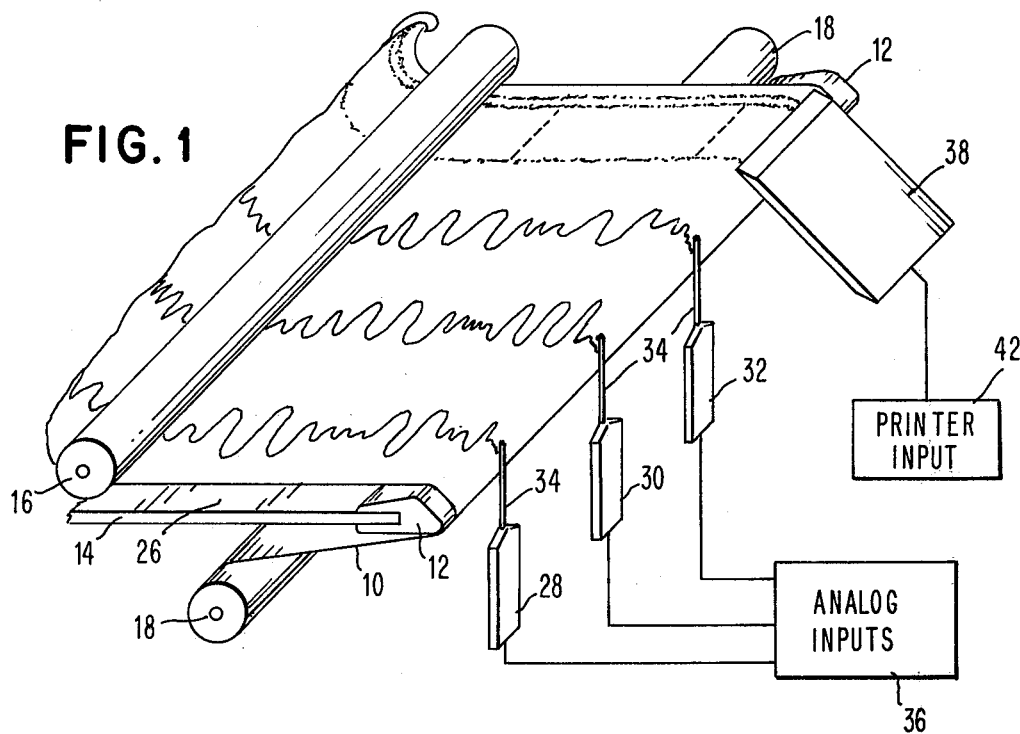
FIG. 1 is a perspective representation of a thermal recorder incorporating the invention.
Figure 2:
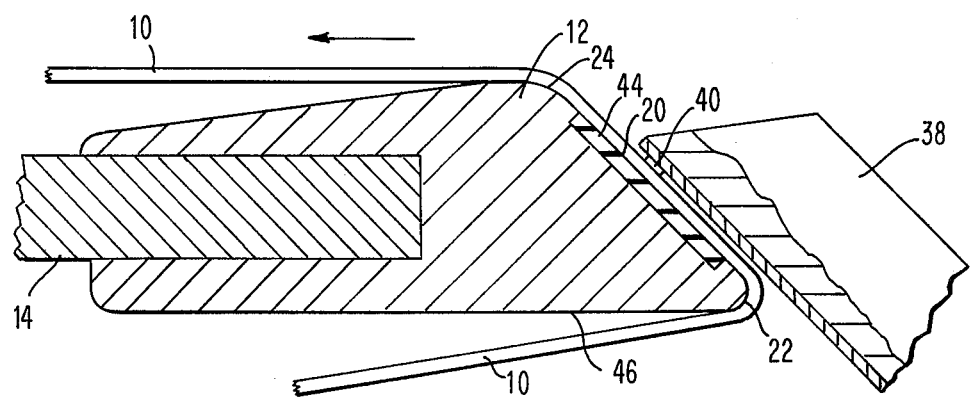
FIG. 2 is an enlarged side sectional view of the recorder knife edge structure and thermal print head.

Referring now to the drawings in which like numbers designate the same parts, a strip of thermally sensitive chart paper 10 is controlled to move at a constant speed around edge structure 12 of platen 14. The chart paper may be any conventional thermally sensitive paper and may be transported around edge structure 12 by any conventional web transporting means so long as contact is maintained between the paper 10 and the edge structure 12. In FIG. 1 a drive roller 16 pulls one end of the paper while some minimum tension on the paper is maintained by paper spool 18.

Edge structure 12 comprises an elongate flat surface 20 having two longitudinal edges 22, 24 which are parallel to each other. Edges 22, 24 are both oriented transversely of the paper strip 10.

Edge 22 acts as a knife edge for galvanometric stylii 28, 30 and 32. Each stylus has an elongated heated cylindrically shaped tip portion 34 which is urged toward the edge 22 and contacts the paper in a line of contact along edge 22. Analog inputs 36 cause the stylii to be galvanometrically driven transversely of the paper causing graphs to be traced out or recorded on the moving thermographic paper.

A thermal print head 38 having an elongate array of selectively heatable elements 40 is urged toward the flat region 20 so that the array of thermal elements 40 is brought into contact with the paper at the flat region 20. The elongate array of thermal elements is oriented so that its longitudinal direction is parallel to the edges 22, 24. When activated in appropriate fashion by the printer input 42, these thermal elements 40 print alphanumeric characters on the paper 10. The characters may be printed as multiple rows or as multiple columns. That is, the character rows may be oriented in the longitudinal direction as shown in FIG. 1 or they may be oriented in the transverse direction.

In the preferred embodiment, there are 200 thermal elements arranged in a staggered row. A print head of this type is sold by Texas Instruments Corp. The total dimension of the row in the direction parallel with edges 22, 24 is about 50 millimeters while the total dimension of the row in the direction of paper travel is about 0.4 millimeters. The elongate array may contain more than one row of thermal elements and the rows need not form straight lines.

Flat surface 20 is resilient over at least the region opposing the heatable elements 40 so that the elongate array of heatable elements may be brought into more uniform contact with the paper. The resilient region 44 of the flat surface 22 should have a durometer rating of between about 10 and 60. Preferably the durometer rating should be between 30 and 40. Hard rubbers and tetrafluoroethylene have such ratings. A coating of tetrafluoroethylene (sold under the trademark Teflon) having a thickness of about 0.2 millimeter is preferred. In practice, a groove of this depth and of suitable width may be formed in the edge structure 12 over the entire length of the flat surface 20 and then back filled with the desired resilient material. A flat surface is then formed by grinding down the resilient material until it is the same height as the shoulders of the formed groove. Except for the resilient region, structure 12 is formed of a hard material such as a metal.

The width (transverse dimension) of the flat surface (in the direction of paper motion) is preferably less than the longitudinal dimension of the array 40. This width should preferably not be less than 1 millimeter nor greater than 10 millimeters. A width for the flat surface of about 4 millimeters is suitable for most purposes.

The radius of curvature of edge 22 should be within the range of about 0.1 millimeter to about 1 millimeter. If the radius is too small, the paper will tend to become torn thereby and a radius too large results in poor plot line quality. A radius of about 0.2 millimeter is preferred. The preferred diameter of the heated stylii tip portions 34 is about 1 to 2 millimeters and the orientation thereof is preferably about perpendicular to the viewing surface 26. The flat surface 20 slopes away from the viewing surface 26 at an angle within the range of about 30 degrees to about 90 degrees and preferably within the range of about 45 to 60 degrees. An angle of about 52.5 degrees is preferred. As shown in the drawings, the edge which is used for plotting is the edge more remote from the viewing surface. The edge used for plotting should also change the direction of paper travel by at least 90 degrees. This results in a change in surface slope between the flat surface 20 and the underside surface 46 within the range of about 90 degrees to 150 degrees, preferably between about 120 degrees and 135 degrees. The preferred angle is about 127.5 degrees.

INDUSTRIAL APPLICABILITY

When recording analog signals with a strip chart recorder, it is frequently desirable to also print alphanumeric information on the same paper strip. This is particularly true in the medical environment where it is usually important to record additional patient data whenever a chart is produced.

It is becoming more practical also for a digital computer to immediately analyze recorded analog data. A computer analysis of such data is generally expressed in alphanumeric terms. In order to be certain that the printed analysis and the recorded analog tracing remain together, it is desirable to generate them both on the same piece of paper. This is particularly true when the alphanumerically expressed analysis is produced immediately. A detailed analysis results in the need for multiple lines of printed characters on the same piece of paper which carries the analog traces. An example of such an application is in the field of automatic computer analysis of electrocardiograms.

Having thus described our invention, what we claim as new, and desire to secure by Letters Patent is:

1. A strip chart recorder for plotting and printing, comprising:
    a viewing platen having a viewing surface;
    an edge structure forming a peripheral edge of said viewing surface, said edge structure comprising first and second closely spaced parallel edges and a flat surface between and connecting said first and and second edges;
    means for controlling a strip of thermally sensitive chart paper to move at a constant speed around and in contact with said first edge, across said flat surface, around and in contact with said second edge, and then across said viewing surface;
    a galvanometric stylus for recording analog signals on said paper, said stylus having an elongate heated tip portion urged toward one of said first or second edges for contact with the paper in a line of contact along said one edge; and
    a thermal print head for printing a plurality of lines of characters on said paper, said print head having an elongate array of selectively heatable elements being positioned and urged toward said flat surface between said first and second edges so as to bring said array into contact with said paper along said flat surface, the longitudinal dimension of said array being parallel with said first and second edges.

2. A strip chart recorder as defined in claim 1 wherein said flat surface is resilient over at least the region opposing said heatable elements so as to bring said elongate array of heatable elements into more uniform contact with said paper.

3. A strip chart recorder as defined in claim 2 wherein said resilient region of said flat surface has a durometer rating of between 10 and 60.

4. A strip chart recorder as defined in claim 3 wherein said resilient region has a durometer rating of between 30 and 40.

5. A strip chart recorder as defined in claim 4 wherein said resilient region comprises a surface layer of tetrafluoroethylene having a thickness of about 0.2 millimeter.

6. A strip chart recorder as defined in claim 1 wherein the transverse dimension of said flat surface is less than the longitudinal dimension of said array.

7. A strip chart recorder as defined in claim 6 wherein the longitudinal dimension of said array is about 50 millimeters and the transverse dimension of said array is about 0.4 millimeter.

8. A strip chart recorder as defined in claim 6 wherein the transverse dimension of said flat surface is within the range of about 1 to 10 millimeters.

9. A strip chart recorder as defined in claim 8 wherein the transverse dimension of said flat surface is about 4 millimeters.

10. A strip chart recorder as defined in claim 1 wherein the radius of curvature of said one edge toward which said heated tip portion is urged is within the range of about 0.1 millimeter to about 1 millimeter.

11. A strip chart recorder as defined in claim 10 wherein the radius of curvature of said one edge is about 0.2 millimeter.

12. A strip chart recorder as defined in claim 1 wherein said flat surface slopes away from said viewing surface at an angle therewith in the range of about 30 degrees to about 90 degrees.

13. A strip chart recorder as defined in claim 12 wherein said flat surface slopes away from said viewing surface at an angle therewith in the range of about 45 degrees to about 60 degrees.

14. A strip chart recorder as defined in claim 13 wherein said flat surface slopes away from said viewing surface at an angle therewith of about 52.5 degrees.

15. A strip chart recorder as defined in claim 1 wherein said one edge toward which said heated tip portion is urged is said first edge.

16. A strip chart recorder as defined in claim 1 wherein said heated tip portion is cylindrical.

17. A strip chart recorder as defined in claim 16 wherein the longitudinal direction of said cylindrical tip portion is approximately perpendicular to said viewing surface.

18. A strip chart recorder as defined in claim 16 wherein said cylindrical tip portion has a diameter within the range of about 1 millimeter to about 2 millimeters.

19. A strip chart recorder as defined in claim 1 wherein said one edge toward which said heated tip portion is urged changes the direction in which the paper travels by at least 90 degrees.

20. A strip chart recorder as defined in claim 19 wherein said one edge toward which said heated tip portion is urged provides a change of surface slope within the range of about 90 degrees to about 150 degrees.

21. A strip chart recorder as defined in claim 20 wherein said one edge provides a change of surface slope within the range of about 120 degrees to about 135 degrees.

22. A strip chart recorder as defined in claim 21 wherein said one edge provides a change of surface slope of about 127.5 degrees.

* * * * *